United States Patent
Irving

[11] Patent Number: 5,919,873
[45] Date of Patent: Jul. 6, 1999

[54] CROSSLINKED PHENOLIC POLYESTERS

[75] Inventor: Nicholas M. Irving, Mixco, Guatemala

[73] Assignee: Rio Oeste, S.A., Guatemala City, Guatemala

[21] Appl. No.: 09/122,161

[22] Filed: Jul. 24, 1998

Related U.S. Application Data

[60] Provisional application No. 60/053,886, Jul. 28, 1997.
[51] Int. Cl.$^6$ .............................. C08F 283/00; C08G 8/04
[52] U.S. Cl. .......................... 525/480; 528/129; 528/153; 528/155; 525/480; 525/508; 524/81; 524/424; 524/425; 524/426; 524/442; 524/451; 524/706; 524/742; 524/773; 428/482
[58] Field of Search ..................................... 528/129, 153, 528/155; 525/480, 508; 524/81, 424, 425, 426, 442, 451, 706, 742, 773; 428/482

[56] References Cited

U.S. PATENT DOCUMENTS

| | | | |
|---|---|---|---|
| 4,347,355 | 8/1982 | Chu | 542/420 |
| 4,500,689 | 2/1985 | Thomas | 525/442 |
| 4,757,118 | 7/1988 | Das et al. | 525/504 |
| 5,621,071 | 4/1997 | Newsham et al. | 528/503 |
| 5,652,047 | 7/1997 | Hesse et al. | 442/327 |
| 5,716,661 | 2/1998 | Scholz et al. | 427/2.31 |

*Primary Examiner*—Samuel A. Acquah
*Attorney, Agent, or Firm*—Cesari and McKenna, LLP

[57] ABSTRACT

Disclosed are novel crosslinked polymers derived from methylol phenols and maleic acid species, and methods of synthesizing these macromolecules. Polyesters and chromandicarboxylic groups are the dominant linkages in the structure of general formula:

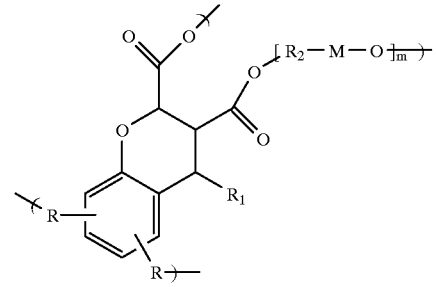

$R$ is H or a spacing group between aromatics, $R_1$ is an aldehyde substituent, $R_2$ a spacing group belonging to multihidric alcohols, $\mathcal{M}$ a maleyl grouping, and $n$ a whole number either 0 or 1.

10 Claims, No Drawings

CROSSLINKED PHENOLIC POLYESTERS

RELATED APPLICATIONS

This application claims priority from U.S. Provisional application Ser. No. 60/053,886, filed Jul. 28, 1997.

BACKGROUND OF THE INVENTION

1. Field of the Invention

The present invention relates to new and useful chemical compounds, specifically to a unique type prepared with methylol phenol and maleic monomers which interact through independent condensation pathways and form crosslinked polymers.

2. Description of the Related Art

There is a countless list of polymers which contain phenolic groups, dating back to the invention of bakelite in the early part of this century. There also are many known polyesters, either saturated or unsaturated. Phenolic polymers belong to the thermoset type, which means they are crosslinked. Polyesters can also be crosslinked, particularly those of the unsaturated type. However, there are no known crosslinked phenolic polyesters because the chemistry that brings together these two big families has not been fully expanded. Phenolic prepolymers are rich in methylol groups or methylene bridges and have particular mechanisms to undergo crosslinking. In the present invention an alternate chemical pathway has been conveniently exploited to incorporate ester linkages into phenolic units. With respect to crosslinked polyesters, this structure is usually achieved by reacting maleic and/or fumaric sites along the polyester backbone with vinylic monomers, of which styrene is most commonly used. In the present invention the versatility of the maleic units has allowed the creation of new polymeric linkages with phenolic molecules.

The literature cites some phenolic polyesters, in some cases chemically modified and crosslinked, and in all cases very different from the polymerization principle involved in the present invention. Hodge and Weimar invented tetramethyladipic acid polyester fibers, and hydroquinone bisphenol A, which remain linear polymers (Ger. Offen.; DE 1937934 700226). Another invention (Das and Prevorsek, U.S. Pat. No. 4,757,118) refers to imide-modified crosslinkable phenolic polyesters. This is a very important innovation in the field of phenolic polyesters, yet the formation of an imide is totally unrelated to the present invention. Furthermore, Japanese workers have invented phenolic polyesters with poly (butylene terephthalate) and a phenolic resin, and obtained a thermoplastic material (Yonetani, Okita, Okita, and Inoe, Jap. Pat 61,168,652 A2 860,730 Showa). Furthermore, a single inventor (Thomas) has made two related inventions. A low-cost polyester modified phenolic resin (U.S. Pat. No. 4,500,689) takes advantage of linseed oil to produce a crosslinked network. The other invention is a phenol-modified a polyester coating containing linoleic acid to promote crosslinking (U.S Pat. No. 4,347,355).

In sum, none of the existing inventions contains solely crosslinked phenolic polyesters, but are either linear polymers (i.e. uncrosslinked) as fibers or thermoplastics, or are crosslinked by conventional modifications (imide formation, or the incorporation of drying oils).

DESCRIPTION OF THE INVENTION

Brief Summary of the Invention

The present invention deals with a new family of crosslinkable polycondensates involving two general monomers, namely methylol phenols, and maleic acid species, which react in a bimodal way. The crosslinked materials thus obtained are high performance polymers, rich in cyclic structures, aromatic groups and polyester linkages. Fabrication of the thermostats is straightforward and involves the mixing of two fluid pre-polymer monomeric species. The method is very convenient for the preparation of reinforced laminates or molded articles.

The phenolic monomer contains substituted or unsubstituted methylol groups, which are formed as a phenolic molecule react is with an aldehyde, most commonly formaldehyde, under alkaline conditions. Crosslinking is dictated by the functionality of the methylol groups, as well as that of the maleic counterpart.

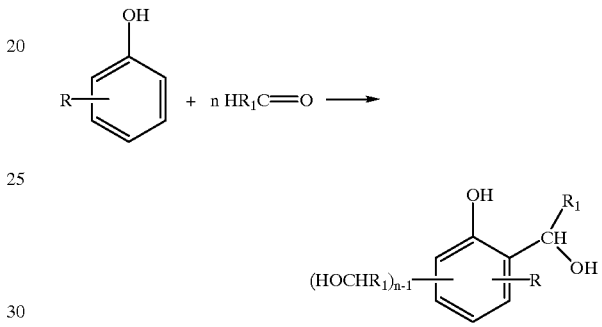

(Eq.1)

where R is H or a spacing group containing between 1 and 3 carbon atoms, and $R_1$ is H, methyl, ethyl, phenyl, furfuryl, or crotonyl and n is a number from 2 to 3.

The maleic monomer can be maleic acid or anhydride, as well as maleic acid esters of multihydric alcohols like diols, triols, tetrols, etc. The preparation of the esters is carried out with suitable catalysts such as organozirconates. As a general illustration, an n-functional alcohol is reacted with n moles of maleic anhydride, according to Equation 2:

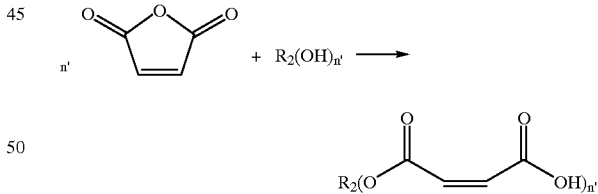

(Eq.2)

where $R_2$ is an alkyl or aryl group and n is a whole number from 2 to 20.

When the pair of monomers (i.e. methylolphenols, abbreviated "A" and maleic species, abbreviated "B") is mixed together, two independent polycondensation reactions take place. With the proper functionality, molecular weight builds up in a step-growth fashion. One of the polycondensation reactions involves the methylolphenol group and a maleic unit, which results in the formation of a chromadnicarboxylic group (K. Hultzsch, J. Prakt. Chem. 158, 275 (1941)), which has a cyclic structure. In the particular case of monomethylol phenol and maleic anhydride the following condensation takes place:

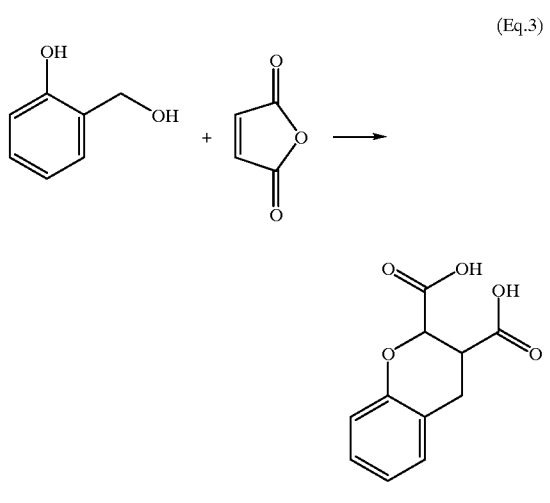

However, catenation will start to occur if dimethylol phenol is used along with maleic anhydride, and the same groups are formed with added complexity, along with esterification between a methylol group and a maleic acid group:

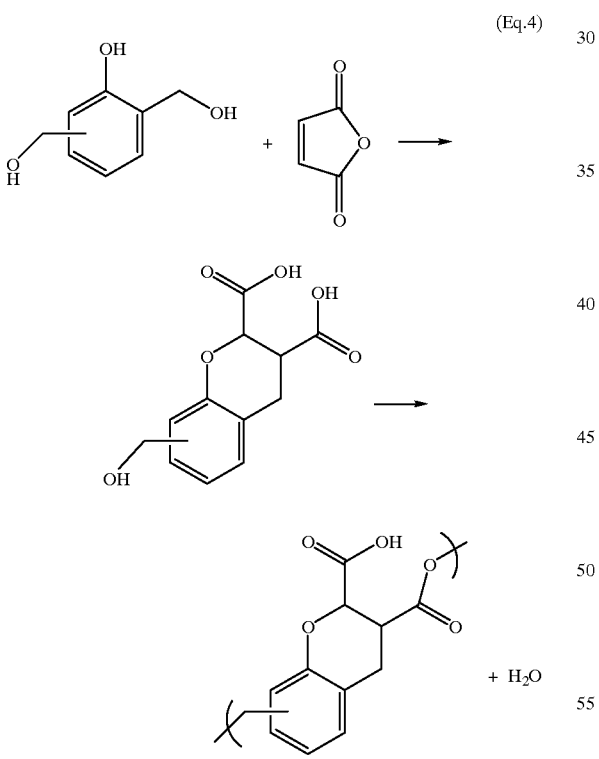

Finally, crosslinking will happen when trimethylol phenol reacts with maleic anhydride:

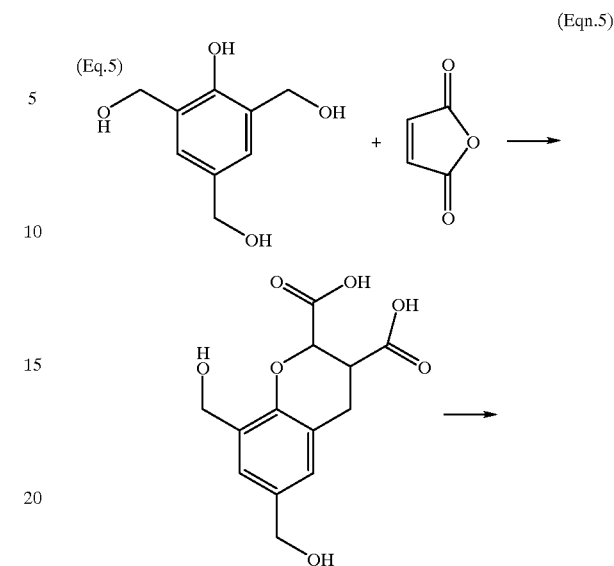

The (poly)esterification involving a methylol phenol (from A) and a maleic acid group (from B) is illustrated by a simple reaction:

$$(A)MeOH + HOOC(B) \rightarrow (A)MeOCO(B) + H_2O \quad (Eq.\ 6)$$

In sum, the result of reacting maleic anhydride or maleic acid with di or trimethylol phenolic species is a novel network phenolic polyester represented by Formula 1 below:

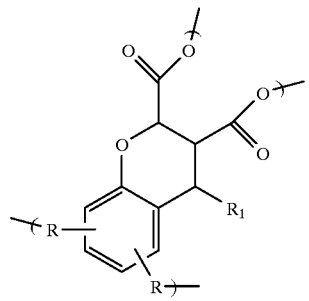

where R is H, methylene, or an alkyl group containing between 2 to 20 carbon atoms, connecting to an aromatic group, and where $R_1$ is H, methyl, ethyl, phenyl, furfuryl, or crotonyl.

The functionality of the maleic species (B) can be extended conveniently according to Equation 2. These products are plurimaleic acid-esters, which in turn can react with multifunctional methylol phenol counterparts. The result is the formation of a tightly crosslinked, bimodal network. Both polycondensations shown in Equations 3 and 6 take place and are favored by acid catalysis or actinic radiation. Thus, a polycondenstation of A and B leading to crosslinking is given by the combination of two moles of dimethylolphenol and one mol of a dimaleic diol ester:

(Eq.7)

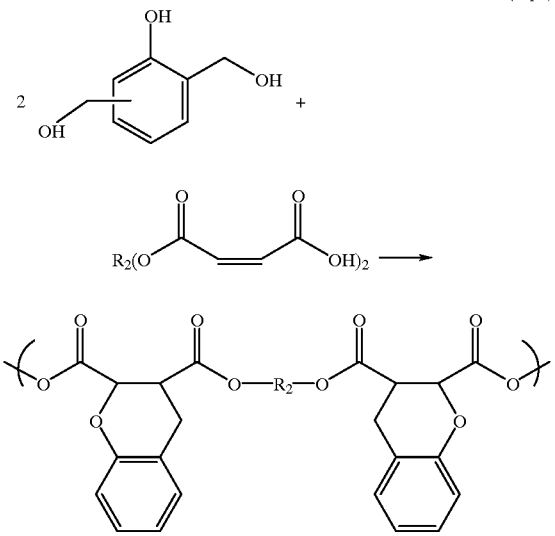

Polycondensations leading to tightly crosslinked networks can be designed in a number of ways. For example, trimethylol phenol and trimaleyl triglyceride will react in an equimolar basis and form a highly crosslinked macromolecule, where Gly stands for the glycerine backbone and the abbreviation 𝓜 represents the maleyl grouping:

(Eq.8)

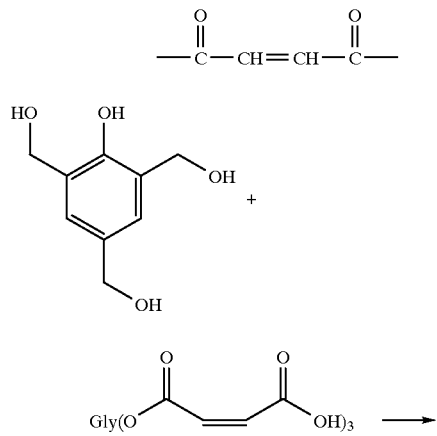

-continued

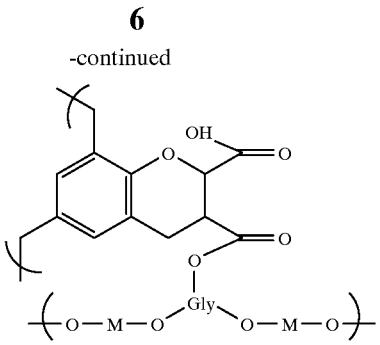

In addition, a bisphenolic tetramethylol also forms similar networks with a dimaleic ester from a diol:

(Eq.9)

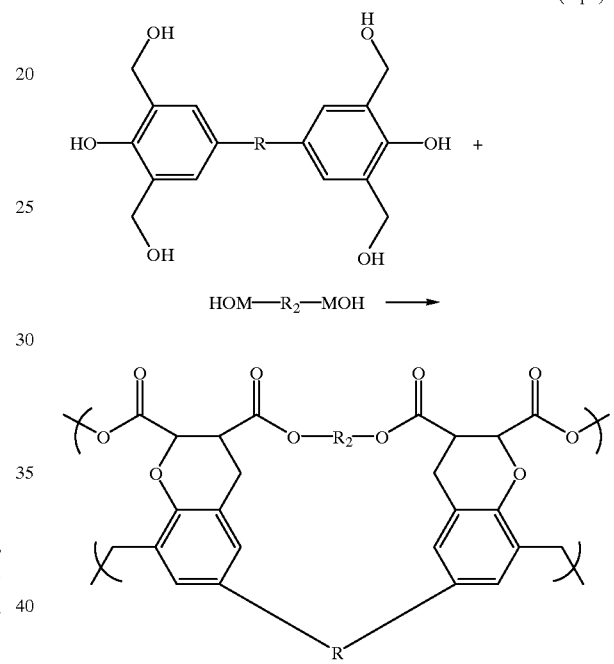

Thus, plurifunctional maleic acid-esters used in combination with di or trimethylol phenolic species form novel crosslinked phenolic polyesters properly represented by Formula 2 below:

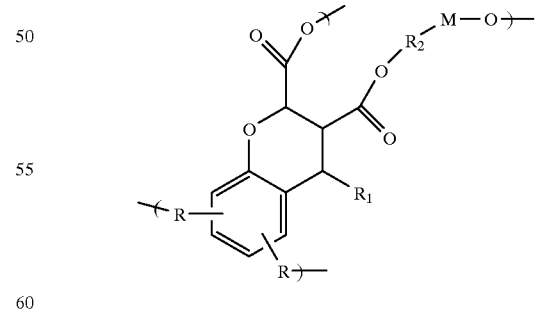

where $R_2$ is a spacing group consisting of at least m methylene units, and m is a whole number from 1 to 20; alternatively $R_2$ is a segment of polyalkylene oxide (where the alkylene group is ethylene, propylene, or butylene) consisting of 1 to 200 of the same units; alternatively $R_2$ contains an aromatic group with at least two but no more than three branches made of alkyl or alkylene oxide groups, each containing between 1 to 20 carbon atoms; the groups R and R1 are defined previously as part of Formula 1, and

 represents the maleyl grouping $$-\overset{O}{\underset{\|}{C}}-CH=CH-\overset{O}{\underset{\|}{C}}-.$$

Crosslinking is favored under acidic conditions, or alternatively, by applying actinic radiation to the polymerizing system. Polymerization can also proceed by simply mixing together both A and B components in the absence of catalyst or external factors, but proceeds at a much slower rate. Maximum crosslinking efficiency is achieved by adjusting the equivalents of phenolic groups to those of maleic groups in a one to one ratio. This way the number of new cyclic units from chromandicarboxylile groups is as high as possible, and the crosslinked polymer reaches optimum mechanical properties. It is also very important to optimize the number of polyester linkages, and this is achieved by allowing enough number of methylolphenol groups to react with maleic carboxylic acid groups. Since one methylolphenol group is committed to the formation of chromandicarboxylic groups, there must be at least one extra methylolphenol available for polymerization. In the particular case of phenol, n must be at least two according to Equation 1.

The bimodal catenation that takes place in the present invention is a dominant factor to reach extensive crosslinking and thus arrive at mechanically sound, useful, structural polymers. In the absence of chromandicarboxylic group formation, polyesterification can take place, but such polymers lack the necessary mechanical properties to be structural. This is the case when, for example, phthalic units are used in place of maleic ones. On the other hand, if a maleic acid monoester of a simple alcohol is used, linear and branched polymers are obtained. The first evidence of crosslinking, however, are observed when methylolphenol prepolymers are reacted with simple maleic acid or its anhydride. In this case ester linkages are formed at methylol units, and cyclic structures form as described. The advantage of using acid ester monomers (Eq. 2) over the use of straight maleic acid or anhydride has to do with ease of application. For example, maleic anhydride must go in some kind of solvent, like acetone, whereas acid esters can be used directly.

DETAILED DESCRIPTION OF AN ILLUSTRATIVE EMBODIMENT

A core element in the present invention is the phenolic group, which has a large number of akin members. Essentially, any phenolic species which can incorporate at least two methylol groups is suitable as type A-monomer precursor. Thus, among the preferred compounds are phenol, bisphenol A, bisphenol B, bisphenol F, monochlorophenol, monofluorophenol, monobromophenol, nitrophenol, cresol, hydroquinone, resorcinol, catechol, anacardic acid, naphthol, phenolphthalin, or any monosubstituted alkyl or aryl phenols.

Formaldehyde is the preferred aldehyde, forming unsubstituted methylol groups. It can be used in any suitable form, namely formalin solution, formaldehyde gas, paraformaldehyde, or trioxane. A number of other aldehydes can be employed as well, such as acetaldehyde, benzaldehyde, furfural, crotonaldehyde, etc., and part of the bulk properties of the crosslinked polymers can be designed by judicious selection of these reagents, which is within the purview of those skilled in the art.

The uniqueness of maleic acid or its anhydride is of paramount importance, as it extends catenation via chromandicarboxylic group formation, as well as polyester formation. The cyclization reaction is not known to take place with its isomer fumaric acid, and also does not occur with phthalic acid or its anhydride. Polyesterification takes place as long as two carboxylic groups are formed, so maleic acid along can be used to crosslink with methylolphenols. The scope of the present invention includes multifunctional maleic acid esters formed by the esterification of multihydric alcohols such as diols, triols, tetrols, or n-ols with one mol of maleic acid or anhydride at every OH site (see Equation 2). Therefore, the selection of multifunctional alcohols is very broad, including ethylene glycol, glycerine, pentaerythritol, diethylene glycol, triethyleneglycol, and higher molecular weight poly(ethylene oxide) diols, triols, tetrols, up to decaols, including all members in between of the series. Other suitable diols and multihydric alcohols are 1, 2 propylene glycol, 1, 4-dihydroxybutane, 1, 5-dihydroxypentane, 1, 6-dihydroxyhexane, butylene glycol, high molecular weight OH-terminated poly (propylene oxide), monosaccharides like glucose, disaccharides like sucrose, and hydrogenated forms of multihydric phenols.

Polymerization takes place by simply bringing together the monomers "A" and "B". Upon mixing, the product becomes bright yellow and starts curing slowly. Heat can be applied to the polymerizing mixture in order to increase the rate of reaction and crosslinking. Also acid can be used for the same purpose at lower temperatures.

The prepolymer system is fluid in its initial stages, and can be conveniently used to prepare composite materials by the incorporation of suitable fillers and/or fibers. Among the suitable fillers are silica gel, calcium carbonate, mica, tire crumb, carbon black, talc, cellulose flock, ceramic powders, clay, etc. preferably in as small a particle size as possible. Selected fibers are those of glass, cellulose and its derivatives, polyolefins, carbon, borosilicates, and polyamides, either aromatic or aliphatic.

EXAMPLES

The following examples are only illustrative of preferred embodiments of this invention, and are not meant to limit its scope. All proportions referred to herein and in the appended claims are by weight, all amounts in terms of mass or volume as indicated, and all temperatures are in degrees centigrade.

EXAMPLE 1

In a 150 μL flask 25.3 g (0.27 mol) of phenol and 26.3 g (0.81 mol) of paraformaldehyde (92%, prills) were mixed with 1mL of NaOH (25%, aq.). The mixture was stirred during 45 minutes at 100 deg., and cooled rapidly. Trimethylolphenol was obtained as a viscous, clear liquid.

EXAMPLE 2

A solution of 5 g (0.05 mol) of maleic anhydride in 5 mL of acetone was mixed with 6 g of the product obtained in EXAMPLE 1. The resulting solution was allowed to stand in the open until acetone evaporated. A thick, yellow mass was obtained, and gelled very rapidly when placed over a boiling water bath. The product was a bright yellow, brittle glass, which turned opaque upon standing.

EXAMPLE 3

A 3 g (0.03 mol) portion of maleic anhydride was heated with 2 mL of water, and the acid allowed to crystallize and dry. Then a 5 g (0.03 mol) portion of trimethylolphenol from EXAMPLE 1 as combined with the maleic acid, and after heating for 5 minutes in a water bath, a right yellow, opaque, strong and brittle crosslinked polymer was obtained.

EXAMPLE 4

In a 250 mL flask 100 g (1.06 mol) of phenol were mixed with 69.4 g (2.13 mol) of paraformaldehyde (92%, prills) and warmed up under agitation while 2 mL of NaOH (25%, aq.) were added. After heating 10 min. at 80 deg. an exotherm took place; heating was briefly discontinued, resumed for 5 min. more, and finally 4 mL of ammonium chloride (3.7 M) were added under stirring, while the product cooled down rapidly. Dimethylolphenol was obtained as a thick, clear liquid.

EXAMPLE 5

In a 250 mL flask 122 g (1.24 mol) of maleic anhydride and 46.5 g (0.61 mol) of propylene glycol were mixed, along with 0.05 mL of Tyzor GR (DuPont). This mixture was stirred at 110 to 120 deg. for 1 hour. After cooling, a clear, colorless, very viscous liquid was obtained, and upon standing it turned white and extremely viscous.

EXAMPLE 6

In a plastic cup a 6.8 g sample of product from EXAMPLE 5 was mixed with 0.3 mL of concentrated HCl, followed by 8.3 g of product from EXAMPLE 4. A bright yellow, thick paste formed, which was poured into a round mold and gelled in two hours at room temperature. It formed a very tough, structural polymer.

EXAMPLE 7

In a 250 mL flask a mixture of 70 g (0.31 mol) of bisphenol-A and 40 g (1.23 mol) of paraformaldehyde 93%, prills) were mixed along with 10 mL of NaOH (5%, aq). Under agitation, this mixture was heated for 15 min. at 80 deg. When an exotherm took place; heating was briefly discontinued, and resumed for 15 min. more at the same temperature. Then 4 mL of ammonium chloride (3.7 M) were added under agitation and cooling. A very thick, clear and colorless liquid was obtained.

EXAMPLE 8

In a 25 mL flask a mixture of 122 g (1.24 mol) of maleic anhydride and 65 g (0.61 mol) of diethylene glycol containing 0.05 mL of Tyzor GF (DuPont) were stirred for 70 min. at 110 deg. After cooling, a clear, colorless, very viscous liquid was obtained, and upon standing it turned white and extremely viscous.

EXAMPLE 9

In a plastic cup a 20.2 g portion of product from EXAMPLE 7 and 15.0 g of product from EXAMPLE 8 were stirred thoroughly, and a bright yellow, thick liquid formed. Part of this uncatalyzed product was applied on fiberglass. It gelled in three days at room temperature, and formed a good, strong laminate with fiberglass.

EXAMPLE 10

In a 250 mL flask 100 g (0.05 mol) of poly(propylene oxide) diol (OH #56.3) were mixed with 0.05 mL of Tyzor TPT (DuPont) and 22 g (0.22 mol) of maleic anhydride, and heated 1 hour at 140 to 145 deg. under constant stirring.

EXAMPLE 11

In a metal cup 10 g of product from EXAMPLE 10 were mixed with 3.7 g of product from EXAMPLE 7 plus a mixture of 1.5 g of product from EXAMPLE 8 and 1.7 g of product from EXAMPLE 4, and a bright yellow, thick liquid was formed. This mixture was then placed over a hot water bath for a few hours. An elastomeric material was obtained.

The previous examples illustrate that this invention applies to a novel family of crosslinkable prepolymers and network polymers which can be designed, prepared, and commercialized with great ease and flexibility. The monomers and reactive mixtures involved can be handled conveniently, and in situ polymerization can be brought about with great ease. The polymers can have different mechanical properties, depending on molecular design, and these can vary from strong and brittle, to tough, to elastomeric. The previous examples have been given as illustrations or descriptions, but not as limitations, and there is no intention of excluding any equivalents of the features given or described. Many modifications are possible within the scope of claims of this invention.

What is claimed is:

1. A crosslinked polymer of formula:

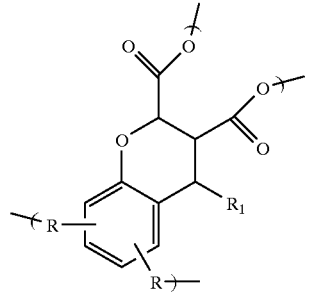

where R is H, methylene, or an alkyl group containing between 2 to 20 carbon atoms, connecting to an aromatic group, and where $R_1$ is H, methyl, ethyl, phenyl, furfuryl, or crotonyl.

2. A crosslinked polymer of formula:

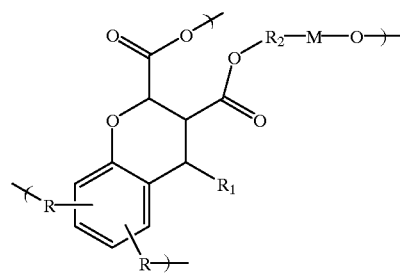

wherein $R_2$ is a spacing group comprising at least m methylene units, and m is a whole number from 1 to 20; alternatively $R_2$ is segment of polyalkylene oxide (where the alkylene group is ethylene, propylene, or butylene) consisting of 1 to 200 of the same units; alternatively $R_2$ contains an aromatic group with at least two but no more than three branches made of alkyl or alkylene oxide groups, each containing between 1 to 20 carbon atoms; R is H, methylene, or an alkyl group containing between 2 to 20 carbon atoms, connecting to an aromatic group, R$_1$ is H, methyl, ethyl, phenyl, furfuryl, or crotonyl, and 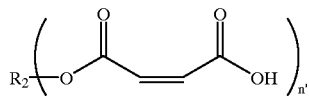 represents a maleyl group.

3. A method of synthesizing a crosslinked polymer, the method comprising the steps of:

a. providing a methylolphenal monomer of formula:

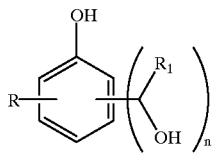

wherein R is H, methylene, or an alkyl group containing between 2 to 20 carbon atoms, connecting to an aromatic group, R$_1$ is H, methyl, ethyl, phenyl, furfuryl, or crotonyl, and n is a whole number from 1 to 3;

b. reacting the methlolphenal monomer with maleic acid species selected from the group consisting of maleic acid, maleic anhydride, and a maleic acid ester of formula:

wherein R$_2$ is a spacing group comprising at least m methylene units, and m is a whole number from 1 to 20; alternatively R$_2$ is segment of polyalkylene oxide (where the alkylene group is ethylene, propylene, or butylene) consisting of 1 to 200 of the same units; alternatively R$_2$ contains an aromatic group with at least two but no more than three branches made of alkyl or alkylene oxide groups, each containing between 1 to 20 carbon atoms; and n' is a whole number from 1 to 10.

4. The method of claim 3, wherein the reacting step comprises heating the monomers to a temperature between 50 and 250 deg. C.

5. The method of claim 3, wherein the mixture of both reacting monomers is catalyzed with organic acids selected from the group consisting of trichloroacetic, oxalic, alkyl or arylsulfonic, and mineral acids selected from the group consisting of hydrochloric, perchloric, phosphoric, nitric, sulphuric.

6. The method of claim 3 wherein the metylphenal monomer and the maleic monomer are combined in a molar ratio from 0.5 to 2.0.

7. The method of claim 3 wherein the metylphenal monomer has a number of methylol groups and the maleic monomer has a number of carboxylic acid groups, the number of methylol groups being greater than the number of acid maleic groups by at least one equivalent.

8. The method of claim 3, wherein the metylphenal molecule is selected from the group consisting of phenol, bisphenol A, bisphenol B, novolacs, naphthol, and substituted phenols, with an aldehyde, selected from the group consisting of formaldehyde, acetaldehyde, benzaldehyde, furfural, and crotonaldehyde, under alkaline conditions between 10 and 200 minutes at temperatures between 50 and 250 degrees C. in ratios between 2 to 3 equivalents of aldehyde per equivalent of phenol, and finally brought to a pH between about 5 and about 9.

9. The method of claim 3 wherein one equivalent of maleic acid or anhydride reacts with one equivalent of hydroxy group of a multihydric alcohol selected from the group consisting of ethylene glycol, glycerol, propylene glycol, diethylene glycol, and polyols in an uncatalyzed reaction, or in the presence of a catalyst selected from the group consisting of organotitanate, organozirconate and tertiary amine between 5 and 300 minutes at temperatures between 50 and 250 deg. C.

10. The method to prepare composite materials with the polymers described in claim 1 or claim 2, which utilizes fillers consisting of ceramics, cellulosics, silica gel, carbon black, tire crumb, talc, and calcium carbonate, and also utilizes reinforcing fibers consisting of cellulosics, polyolefins, carbon, borosilicates, and polyamides.

* * * * *

UNITED STATES PATENT AND TRADEMARK OFFICE
CERTIFICATE OF CORRECTION

PATENT NO.    : 5,919,873
DATED         : July 6, 1999
INVENTOR(S)   : Nicholas M. Irving It is certified that error appears in the above-identified patent and that said Letters Patent is hereby corrected as shown below:

Column 11,
Lines 10 and 23, replace "methylolphenal" with -- methylolphenol --.

Column 12,
Lines 8, 11 and 16, replace "metylphenal" with -- methylolphenol --.

Signed and Sealed this

Thirtieth Day of April, 2002

Attest:

JAMES E. ROGAN
*Director of the United States Patent and Trademark Office*

*Attesting Officer*